United States Patent [19]
Eisenberg

[11] Patent Number: 5,354,974
[45] Date of Patent: Oct. 11, 1994

[54] AUTOMATIC TELLER SYSTEM AND METHOD OF OPERATING SAME

[75] Inventor: Alan J. Eisenberg, Monmouth Junction, N.J.

[73] Assignee: Base 10 Systems, Inc., Trenton, N.J.

[21] Appl. No.: 981,038

[22] Filed: Nov. 24, 1992

[51] Int. Cl.⁵ .............................................. G06K 5/00
[52] U.S. Cl. ..................................... 235/379; 235/380
[58] Field of Search ................................ 235/379, 380

[56] References Cited

U.S. PATENT DOCUMENTS 4,304,990  2/1981  Atalla .
4,359,630  11/1982  Simonotti et al. .
4,375,032  2/1983  Uchida .
4,650,980  6/1985  Mizutani .
4,675,815  9/1985  Kuroki et al. .
4,798,941  10/1988  Watanabe .
4,801,787  1/1989  Suzuki .
5,029,290  7/1991  Parsons et al. .
5,095,196  3/1992  Miyata .
5,103,079  4/1992  Barakai et al. .

Primary Examiner—Harold Pitts
Attorney, Agent, or Firm—Sprung Horn Kramer & Woods

[57]  ABSTRACT

An automatic teller system and a method of operating same wherein the system can receive a personalized normal PIN number and emergency PIN number from a user. If the user enters the emergency PIN number, the system determines that it is an emergency PIN number and actuates a silent alarm. The system will also simulate a normal transaction so as to not alert a thief or potential thief that the alarm has been actuated.

5 Claims, 2 Drawing Sheets

AUTOMATIC TELLER SYSTEM AND METHOD OF OPERATING SAME

BACKGROUND OF THE INVENTION

The present invention relates to an automatic teller system and a method of operating same.

Current automatic teller systems allow a user to withdraw cash from an automatic teller machine (ATM) by first inputting a credit card into a card reader and thereafter entering a personal identification number (PIN number) on a keypad. The system determines that the user is authorized to make a withdrawal on the basis of the correctness of the PIN number, and thereafter determines the credit limit for that particular credit card. The system thereafter prompts the user on a display for the amount of cash to be withdrawn, and the user enters the cash amount on the keypad. The request is processed up to the credit limit, and cash is dispensed to the user.

In recent years, it has become common for thieves to pray on automatic teller machine users, by either accosting the user after completing a transaction or by inducing the user under the threat of force to make a withdrawal from the user's account.

The current systems such as those shown in U.S. Pat. Nos. 4,359,630; 5,029,290; 5,103,079; 5,095,196; 4,801,787; 4,798,941; 4,650,980; and 4,304,990 have no way in which to enable the user to signal that either there is a fear of being accosted upon finishing the transaction or that the transaction is being entered into under duress.

In U.S. Pat. No. 4,375,032 a transaction processing system is disclosed wherein when card is reported lost or stolen by a user, its subsequent unauthorized use triggers a mode wherein the transaction is delayed to detain the unlawful user. No use is made of a PIN number.

In U.S. Pat. No. 4,675,815 a system is described wherein a bank employee at a remote location who is crediting funds to an account can enter a predetermined code in place of another entry to indicate an unlawful transfer. This system does not utilize a PIN number for each transaction and uses a single code for all users to signal a problem.

SUMMARY OF THE INVENTION

The main object of the present invention is to eliminate the disadvantages of the present systems and to provide an automatic teller system and a method of operating same to enable a user to actuate an alarm without alerting a thief or potential thief.

These and other objects and advantages of the present invention are achieved in accordance with the present invention by a method of operating an automatic teller system wherein the user is assigned a unique or personalized emergency PIN number in addition to the normal unique PIN number. The system then checks the entered PIN number to determine whether it is an emergency PIN number for that user or not and, if an emergency PIN number has been entered, actuating an alarm, preferably a silent alarm. Moreover, the method includes enabling cameras set up at the automatic teller system to record the transaction either in an enhanced manner or with more cameras so that the identity of the thief can be more reliably obtained for later apprehension and conviction. The silent alarm will enable bank security people or the police to be dispatched immediately to the ATM. Video and audio information can be transmitted via modem to bank security people or the police at the same time.

Each user is assigned a personalized emergency PIN number similar to the standard PIN number, instead of a common one for all users. It is impossible for a thief to know that an emergency PIN number has been entered since the numbers would not be easily identified, i.e., one user may have an emergency PIN number which is the same as another user's standard PIN number.

In a preferred embodiment of the present invention, the method also includes simulating a normal transaction in response to the determination that an emergency PIN number has been entered. The simulated transaction is carried out so as to avoid alerting the thief or potential thief that authorities have been notified. In the simulated normal transaction, the user is prompted for the amount of cash to be withdrawn on the display as in a normal transaction, and the user is thereafter asked to enter a cash amount on the keypad similar to a normal transaction. However, this system will automatically indicate that the credit limit is less than the amount requested so that only a limited amount of cash will be dispensed. This will reduce the amount of the theft while appearing to be a normal transaction and not alerting the thief to the fact that an alarm has been actuated.

Moreover, the cash dispenser can dispense marked bills from a special supply of bills, so that the bills that are dispensed can be identified later.

These and other features and advantages of the present invention are also achieved in accordance with an automatic teller system according to the present invention comprising means receptive of a personal PIN number and a unique or personalized emergency PIN number input by a user, means for determining that an entered PIN number is an emergency PIN number and means responsive to that determination for actuating an alarm, preferably a silent alarm. The automatic teller system according to the present invention also preferably includes means for simulating a normal transaction in response to the determination that an emergency PIN number has been entered including means for dispensing a predetermined limited amount of cash to the user.

These and other features of the present invention will be described in the following detailed description of the invention taken with the attached drawings, wherein:

DETAILED DESCRIPTION OF THE INVENTION

Figure 1:
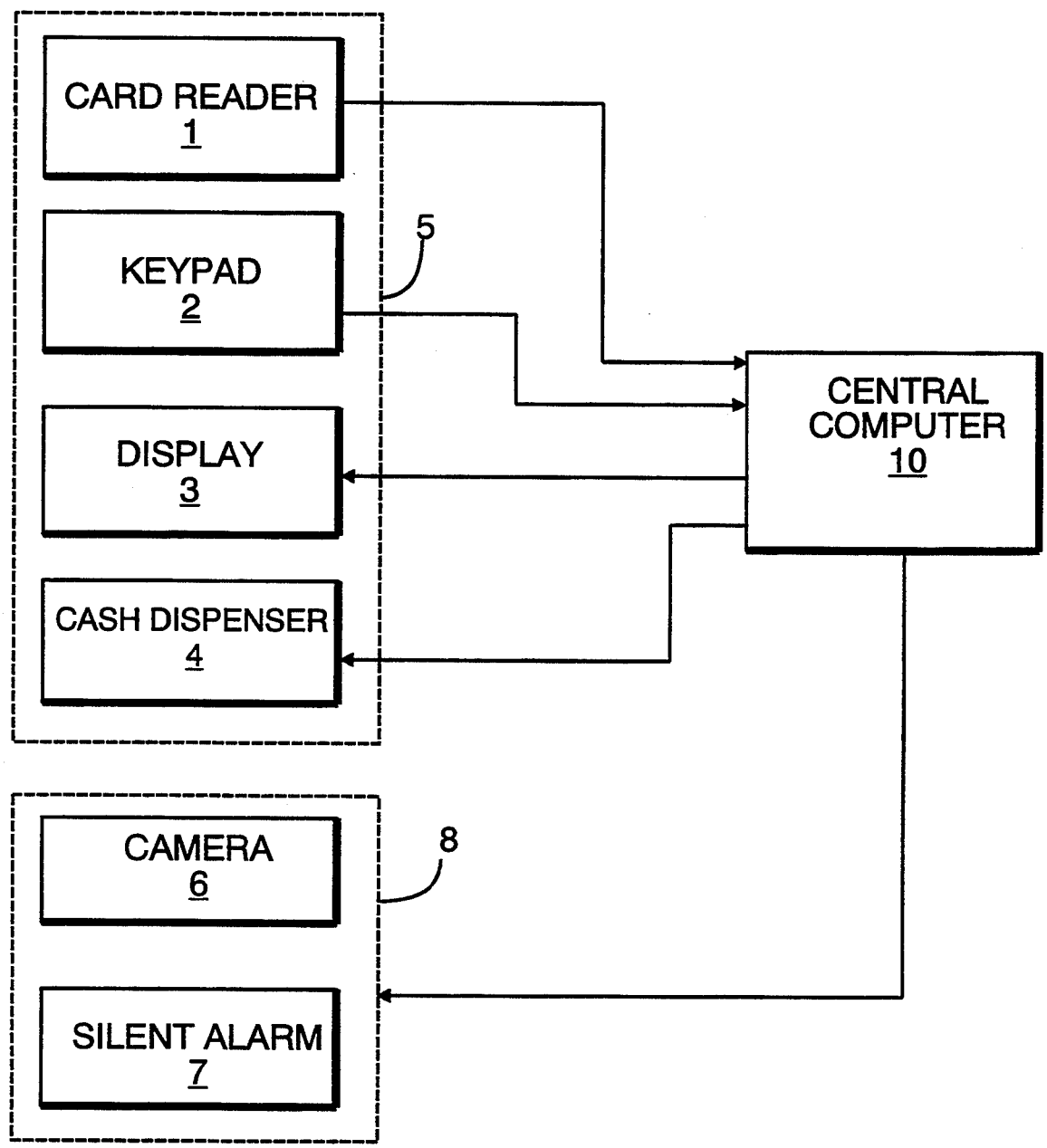
FIG. 1 is a block diagram of the automatic teller system in accordance with the present invention.

Referring now to FIG. 1, the automatic teller system according to the present invention includes an automatic teller machine (ATM) 5 which includes a magnetic stripe card reader 1, a user keypad 2, a display 3 and a cash dispenser 4. The system also includes a central computer 10 which receives the information read from the credit card reader 1 and personal identification numbers entered on keypad 2 and prompts the user via display 3 and actuates cash dispenser 4 to dispense cash to the user.

The keypad 2 is used by a user to enter a personal identification number in the form of either a normal PIN number or an emergency PIN number which has been assigned to the user by the bank. The central computer 10 receives the PIN number from the keypad 2 and is able to determine, based upon lists of PIN numbers for each account indicated by the card reader 1, whether the PIN number is a normal PIN number or an emergency PIN number. The central computer 10, upon determining that the PIN number is an emergency PIN number, controls a silent alarm 7 which immediately notifies the authorities that a theft is taking place at the ATM 5. The central computer 10 also actuates camera 6 either by enabling additional views of the scene or by enhancing the view of the scene such as by taking a close up of the scene.

Figure 2:
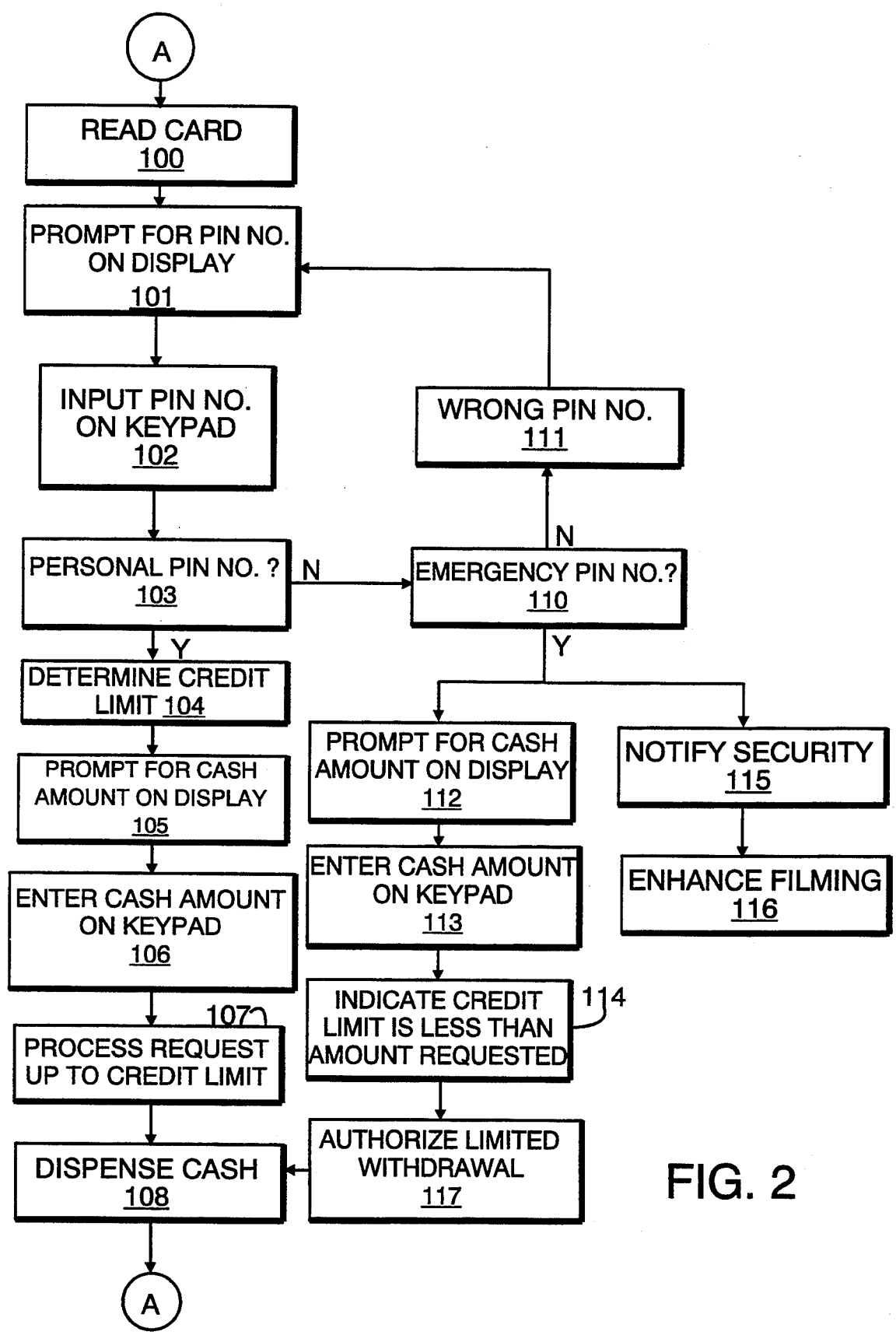
FIG. 2 is a flow chart of the method according to the present invention.

The method of operating the automatic teller system is set forth in FIG. 2. As shown therein, at the starting point A the user inputs a magnetic stripe credit card into a card reader, and the card reader reads the card in step 100. The information is sent to the central computer 10 which then prompts the user on display 3 for entry of the PIN number in step 101. The user inputs the PIN number in step 102 via keypad 2. This information is sent to the central computer 10 which, in step 103, determines whether it is a personal PIN number or not. If the PIN number is the normal personal PIN number, the computer then determines the credit limit in step 104 and prompts the user on display 3 in step 105 for the amount of cash desired for withdrawal. The user then enters the amount of cash desired in step 106 on keypad 2 and the central computer 10 receives this information and processes this request in step 107 up to the credit limit. Thereafter, the central computer 10 in step 108 actuates the cash dispenser to dispense cash. The system then returns to the ready state of step A.

If on the other hand, the central computer 10 determines in step 103 that the PIN number is not the normal personal PIN number, the central computer then makes a determination in step 110 if it is an emergency PIN number. If it is not an emergency PIN number, the determination is made in step 111 that it is just the wrong PIN number and the user is again prompted in step 101 to enter a PIN number on the keypad 2.

If the central computer 10 determines in step 110 that it is an emergency PIN number assigned to that user, the central computer then acts to perform two functions. The first function in steps 115 and 116 is to actuate a silent alarm and notify security in step 115 of a theft or a potential theft taking place. In step 116, the central computer actuates a camera 6 to either start filming the scene or to enhance the filming by obtaining a close up of the scene.

The other function carried out by the central computer 10 is to simulate a normal transaction so as to avoid alerting the thief or potential thief that an alarm has been actuated. In this matter, the central computer 10 controls the display 3 to prompt the user for a cash amount in step 112. The user then enters the desired amount of cash on keypad 2 in step 113. Rather then treating this transaction wherein the user is permitted to withdraw an amount up to the user's actual credit limit, the central computer controls display 3 to indicate that the credit limit is less than the amount requested in step 114 so as to artificially limit the amount of the transaction to reduce the amount of theft. The central computer then authorizes this limited withdrawal in step 117 and actuates cash dispenser 4 in step 108 to dispense this limited amount of cash. The system then returns to the ready state in step A.

It is understood that the present invention is not limited to the particular embodiments illustrated and described hereinabove, but that various changes and modifications may be made without departing from the spirit and scope of the invention as defined in the claims.

What is claimed is:

1. In a method of operating an automatic teller system wherein a card is input by a user, the card is read, a personalized normal first PIN number selected by the user is entered by the user and is checked to determine whether the use of the card is authorized, if authorized a credit limit is determined and a desired amount of cash not exceeding the credit limit is dispensed to the user, the improvement comprising the steps of: providing a personalized emergency second PIN number to each user selected by the user in addition to the personalized normal first PIN number; checking the entered PIN number of each user to determine whether it is the normal first or emergency second PIN number of that user; and actuating an alarm in response to the determination of an entered emergency second PIN number for that user, while dispensing a limited amount of cash to that user.

2. The method according to claim 1, further comprising simulating a normal transaction upon the determination of an entered emergency second PIN number by prompting the user to enter a desired amount of cash, displaying a message that the desired amount exceeds the user's credit limit and dispensing a preselected limited amount of cash.

3. The method according to claim 1, wherein the step of actuating an alarm comprises actuating a silent alarm.

4. The method according to claim 1, further comprising enabling cameras at the automatic teller system in response to a determination of an entered emergency second PIN number.

5. The method according to claim 1, wherein the step of dispensing a limited amount of cash comprises dispensing marked bills.

* * * * *